United States Patent [19]
Rori et al.

[11] Patent Number: 4,973,075
[45] Date of Patent: Nov. 27, 1990

[54] INDEPENDENT SUSPENSION TOE AND CAMBER ADJUSTMENT SYSTEM

[75] Inventors: Hadrian A. Rori, Farmington; Walter A. Hoenle, Warren, both of Mich.

[73] Assignee: Chrysler Corporation, Highland Park, Mich.

[21] Appl. No.: 445,515

[22] Filed: Dec. 4, 1989

[51] Int. Cl.$^5$ ............................................. B62D 17/00
[52] U.S. Cl. .................................. 280/661; 280/96.1; 280/673
[58] Field of Search ............... 280/661, 664, 665, 660, 280/701, 668, 96.1, 673; 384/626; 29/401.1

[56] References Cited

U.S. PATENT DOCUMENTS

| | | | |
|---|---|---|---|
| 4,313,617 | 2/1982 | Muramatsu et al. | 280/661 |
| 4,462,241 | 7/1984 | Whisenant | 280/661 |
| 4,616,845 | 10/1986 | Pettibone | 280/661 |
| 4,618,162 | 10/1986 | Specktor et al. | 280/661 |
| 4,684,150 | 8/1987 | Specktor et al. | 280/661 |
| 4,706,987 | 11/1987 | Pettibone et al. | 280/661 |
| 4,718,691 | 1/1988 | Specktor et al. | 280/661 |
| 4,736,964 | 4/1988 | Specktor | 280/661 |
| 4,753,454 | 6/1988 | Woehler | 280/661 |
| 4,795,187 | 1/1989 | Ingalls | 280/661 |

Primary Examiner—Richard A. Bertsch
Attorney, Agent, or Firm—Edward P. Barthel

[57] ABSTRACT

An independent suspension toe and camber adjustment system. The suspension includes four links per side, each side including two different length laterally extending upper control arms, one laterally extending lower control arm, and a longitudinally extending trailing arm. Selected locations, lengths and orientations of the respective arms provide inherent predetermined camber and toe patterns. The adjustment system includes an inverted U-shaped bracket having off-center, aligned openings formed through the legs of the bracket, and mounted on respective fore and aft upper mounting lugs of the knuckle for adjustable cooperation with the outermost ends of the two different length, laterally extending, upper control arms.

7 Claims, 6 Drawing Sheets

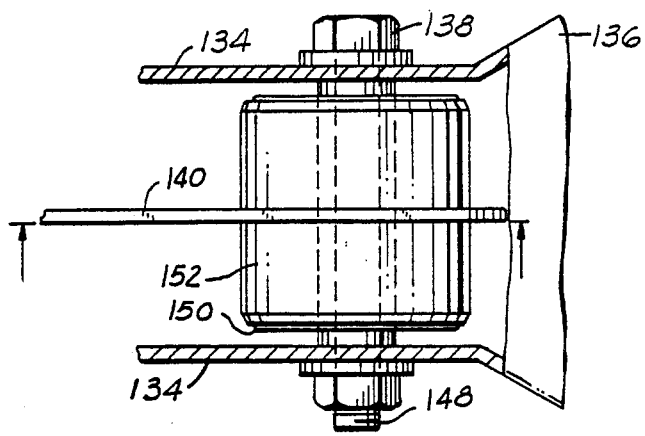
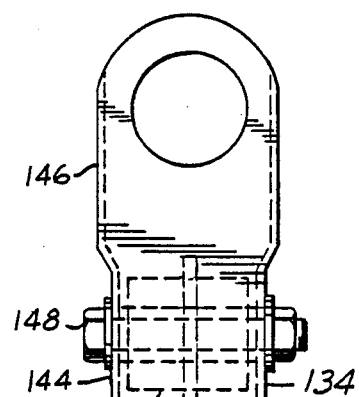
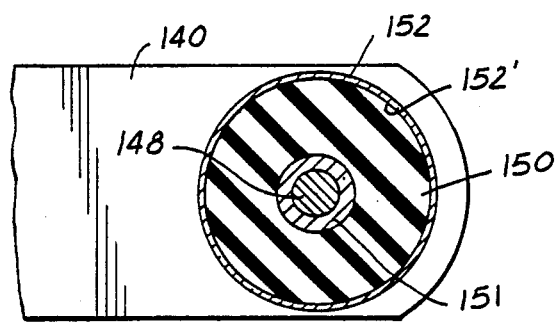
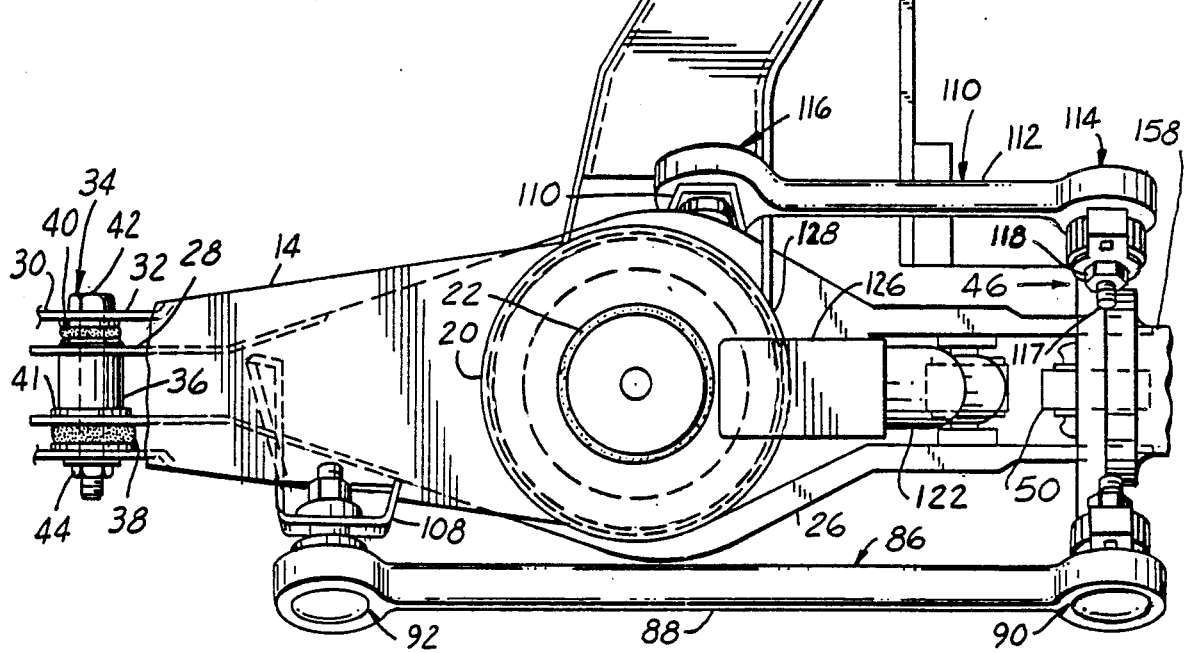
FIG. 2A
FIG. 2B
FIG. 2

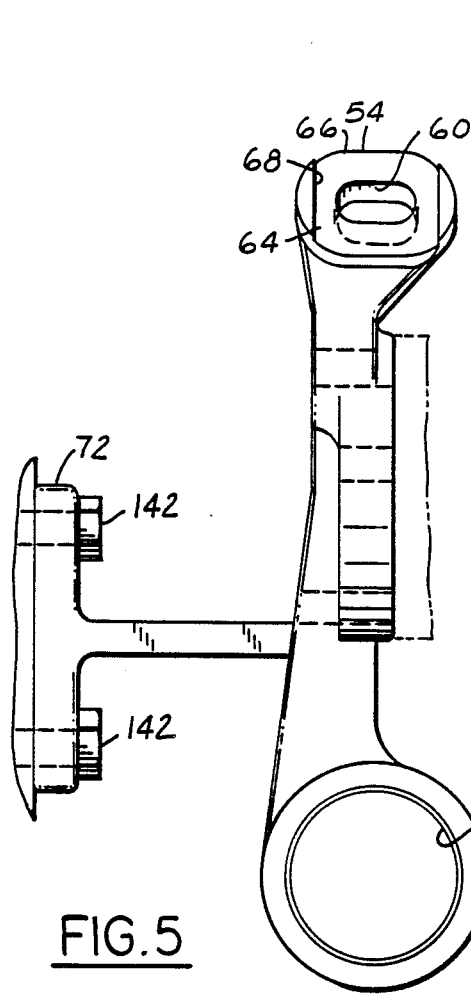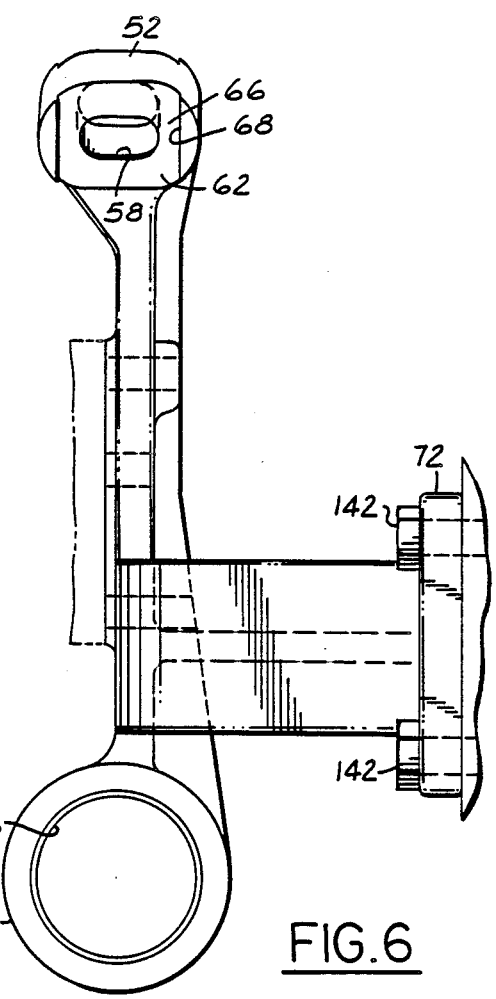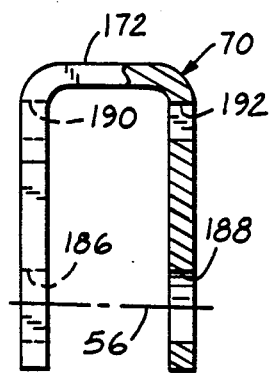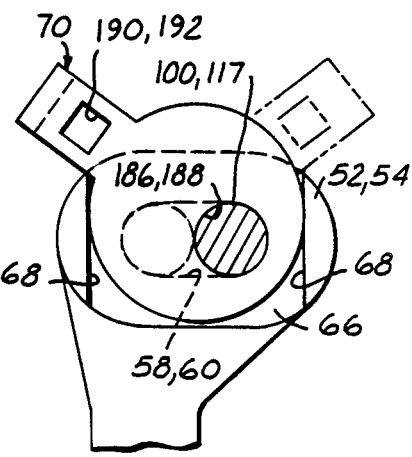

INDEPENDENT SUSPENSION TOE AND CAMBER ADJUSTMENT SYSTEM

TECHNICAL FIELD

This invention relates generally to suspension systems and, more particularly, to an independent suspension toe and camber adjustment system.

BACKGROUND ART

Heretofore, adjustment devices for setting the camber and toe of motor vehicle wheels have generally had their own individually designed structures involving generally an eccentric element connected to one of two components pivotally connected to each other, such as shown and described in Muramatsu et al. U.S. Pat. No. 4,313,617. However, where a single apparatus has been provided for adjusting both camber and toe, it has, as one example, consisted of an assortment of washer-like plates tapered from a thin end a to thick end in shim-like fashion, each with a peripheral surface having a plurality of outwardly facing irregularly spaced bolt-engaging notches. Such a combined camber and toe adjusting arrangement is shown and described in Spektor et al. U.S. Pat. No. 4,684,150.

Another known combined camber and toe adjustment arrangement is shown and described in Pettibone U.S. Pat. No. 4,616,845. This arrangement is adaptable to a rear suspension having a shock strut attached at its upper end to a vehicle frame and its lower end fixedly secured to a spindle assembly, and with two side-by-side lower control arms connected between the spindle and two adjustment brackets secured to a central portion of a frame cross member. Adjustment of one of the arms at its inner end adjusts the toe angle, whereas adjustment of both of the arms at their inner ends by approximately the same amount adjusts the camber angle.

DISCLOSURE OF THE INVENTION

A general object of the invention is to provide an improved toe and camber adjustment arrangement for an independent suspension system.

Another object of the invention is to provide a rear suspension sub-assembly which incorporates means for shifting a selected camber and toe settings curve prior to installation of the sub-assembly on a vehicle.

A further object of the invention is to provide an improved right hand and left hand four link rear suspension system having two upper control arms, one lower control arm and a trailing arm, and means associated with the two upper control arms for adjusting the toe and camber settings.

Still another object of the invention is to provide a rear suspension system wherein each side thereof includes two upper lateral links or control arms which serve to set camber and/or toe alignment, and means operatively connected to the knuckle and to the outermost ends of the two upper lateral control arms for adjusting the toe and camber settings of the rear wheels.

A still further object of the invention is to provide a toe and camber adjustment device for an independent suspension system, including an inverted U-shaped bracket with round ends formed on the legs thereof for being pivotally mounted on the upper fore and aft mounting lugs of the suspension knuckle, and having off-center openings formed through the round ends for cooperating with the ends of upper control arms also mounted on the fore and aft mounting lugs to change the relationship therebetween to thereby shift toe and camber curves back to the desired curb-zero degree settings.

A still further object of the invention is to provide an adjustment apparatus and method whereby a mounting member and link interconnected through a ball joint cantilevered at the end of the link with a bolt extending through an elongated opening in the mounting member may be moved relative to one another without twisting or angling the bolt in the elongated opening.

These and other objects and advantages will become more apparent when reference is made to the following drawings and related description.

BRIEF DESCRIPTION OF THE DRAWINGS

FIG. 2 is a top view of the FIG. 1 structure;

FIG. 2A is an enlarged, fragmentary cross-sectional view of a portion of the FIG. 2 structure;

FIG. 2B is a cross-sectional view taken along the plane of the lines 2B—2B of 2A, and looking in the direction of the arrows;

FIG. 3A is a cross-sectional view taken along the plane of line 3A—3A of FIG. 3, and looking in the direction of the arrows;

FIGS. 5 and 6 are end views taken along the respective planes of the lines 5—5 and 6—6 of FIG. 4, and looking in the directions of the arrows;

FIG. 8 is an end view of the FIG. 7 structure;

FIG. 10 is an enlarged fragmentary view taken along the plane of the lines 10—10 of FIG. 9, and looking in the direction of the arrows;

FIG. 11 is a view similar to FIG. 10, but in a different operational position;

BEST MODE FOR CARRYING OUT THE INVENTION

Figure 1:
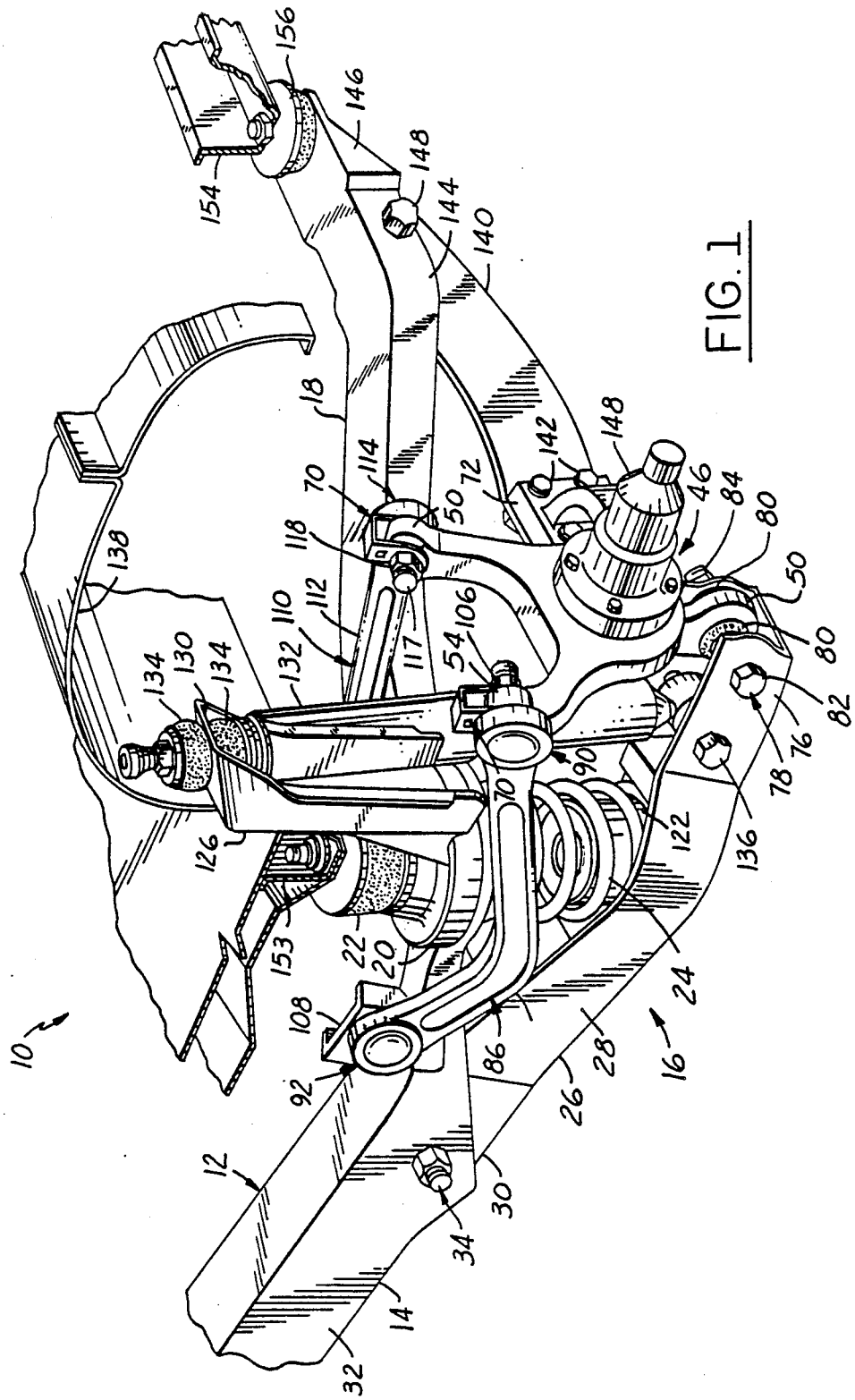
FIG. 1 is a fragmentary perspective view of an independent suspension sub-frame embodying the invention.
Figure 3:
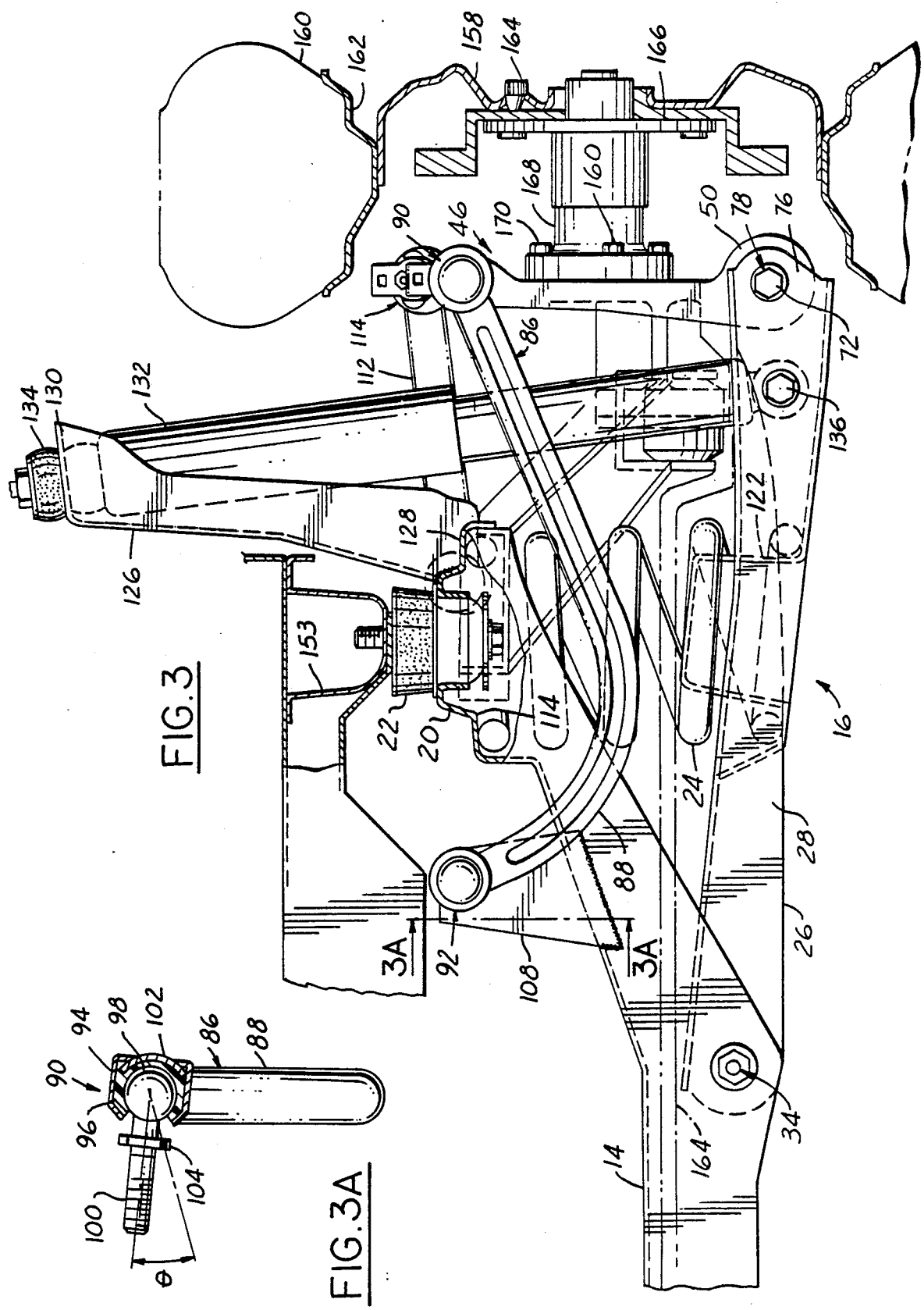
FIG. 3 is a rear view of the FIG. 1 structure, and including the wheel assembly mounted thereon.

Referring now to the drawings in greater detail, FIGS. 1–3 illustrate an independent rear suspension 10 including a sub-frame 12 which is adapted to extend laterally across a vehicle at a central inverted U-shaped portion 14 thereof, with right and left rear suspension components 16 operatively mounted thereon. The sub-frame 12 also includes a forwardly extending inverted U-shaped portion 18 formed at each outside end thereof. A circular mounting portion 20, suitable for mounting a rubber isolator 22 on the upper side thereof and a coil spring 24 on the under side thereof, is integrally formed as the juncture between the inverted U-shaped portions 14 and 18.

A U-shaped lower control arm 26 having variable spaced walls 28 is pivotally mounted at its inner end 30 within the spaced walls 32 (FIG. 2) of the central inverted channel portion 14 of the cradle 12 by a pivot assembly 34. The latter pivot assembly 34 includes a metal sleeve 36 combined with a three-diameter bushing in such a way that the largest diameter end 38 abuts against the end of the sleeve, while the smallest diameter end 40 extends through the spacer, and the mid-diameter portion is compressed within the spacer. When assembled, the rubber end portions 38 and 40 are mounted inside the respective walls 32, with the spacer 36 extended through an opening 41 formed in one wall 28 of the control arm 26. The walls, spacer and rubber end portions are retained as a unit by a bolt 42 passing therethrough and secured by a nut 44. This arrangement serves to reduce twist in the lower control arm 26 during jounce and rebound.

Figure 4:
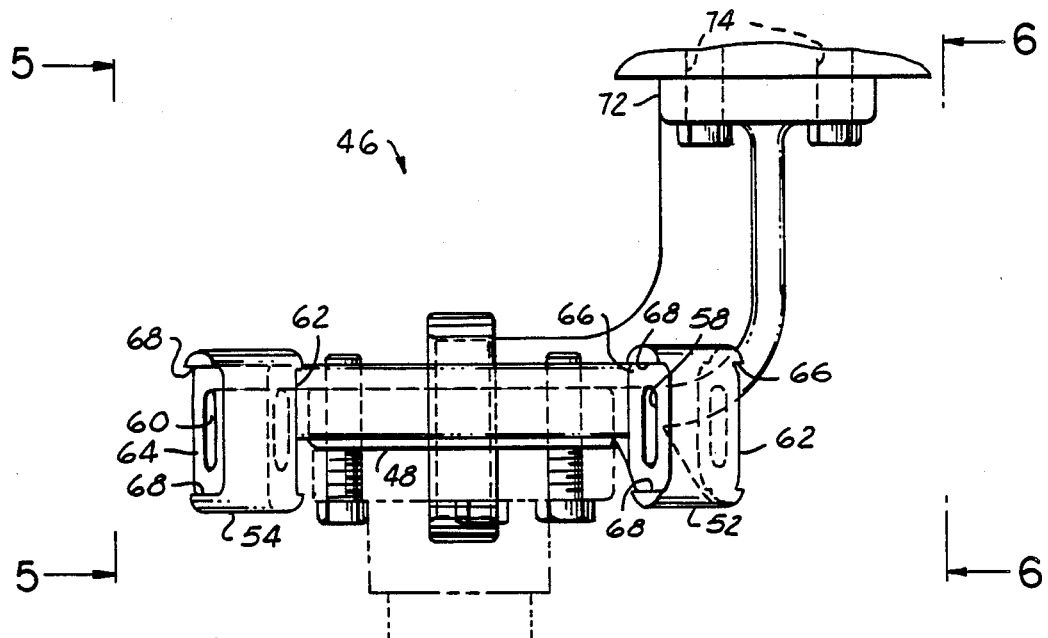
FIG. 4 is a top view of the knuckle portion of the FIG. 1 structure.

A knuckle 46, shown in detail in FIGS. 4–6 and 9, includes a central hub portion 48 having a lower mounting lug 50 and two upper fore and aft mounting lugs 52 and 54, respectively, formed thereon. The lugs 50, 52 and 54 have respective circular opening 56 (FIG. 9) and slotted openings 58 and 60 (FIG. 4) formed therethrough. Each of the fore and aft faces 62 and 64 of each of the two upper fore and aft mounting lugs 52 and 54 is formed to include a slot 66 (FIGS. 4–6). Each slot 66 is defined by a pair of parallel shoulders 68 which guide the rotation therein of an adjustment bracket 70 (FIGS. 7–11) to be described.

A mounting plate 72 (FIGS. 4–6 and 9) having four threaded holes 74 formed therethrough is formed to extend forwardly (with respect to the vehicle) of the central hub portion 48, and on a plane spaced a predetermined distance from the plane of the central hub portion inwardly with respect to the vehicle. The knuckle 46 is pivotally connected at its lower mounting lug 50 to the outer U-shaped end 76 of the lower control arm 26 by a pivot member 78 (FIG. 1). The latter pivot member 78 includes a cross-axis ball joint 80 (FIG. 1) through the lug 50, with a bolt 82 extending through the walls 28, the lug 50 and the ball joint 80 and secured by a nut 84.

The long rear (with respect to the vehicle) upper control arm 86 includes a body portion 88, partially straight and partially bent so as to avoid contacting adjacent vehicle components, with mounting portions 90 and 92 formed on the opposite ends thereof. Each end mounting portion 90 and 92 embodies a ball joint arrangement (FIG. 1A) including a cylindrical cover 94 whose axis is substantially perpendicular to the adjacent axis of the body portion 88. The cylindrical cover encompasses a rubber member 96 molded around a spherical head 98 of a mounting bolt 100 extending from one end of the cylindrical cover. A spherical-shaped cap 102 is mounted in the other end of the cylindrical cover 94. Since the bolt 100 is pivotally moveable in all directions, as indicated by angle 0 in FIG. 1A, within the cylindrical cover 94, a stop collar 104 is formed on the bolt 100 a predetermined distance from the exit end of the cylindrical cover.

The upper control arm 86 is pivotally mounted at its outer end 90 by virtue of the bolt 100 extending through the slotted opening 60 of the aft mounting lug 54 of the knuckle 46 and secured by a nut 106, and at its inner end 92 by virtue of the bolt 100 extending through a mounting flange 108 (FIG. 1) formed on the outer upper end of the cradle central portion 14 adjacent the circular mounting portion 20.

A short forward (with respect to the vehicle) upper control arm 110 (FIG. 1) includes a body portion 112 with ball joint mounting portions 114 and 116 formed on the opposite ends thereof, similar to the ball joint ends 90 and 92 of the longer control arm 86. The end 114 is secured to the fore mounting lug 52 of the knuckle 46 by a bolt 117 and nut 118, and the end 116 is secured to a mounting flange 120 (FIG. 2) formed on the outer upper end of the cradle forwardly extending portion 18 adjacent the circular mounting portion 20.

The coil spring 24 (FIGS. 1 and 3) is mounted in between a lower spring seat 122 formed at an intermediate portion of the lower control arm 26, and an upper spring seat 124 (FIG. 3) formed within the circular mounting portion 20 of the sub-frame 12.

An upwardly extending shock absorber mounting bracket 126 is formed on an outer edge portion 128 (FIG. 3) of the circular mounting portion 20 of the sub-frame 12. A mounting flange 130 (FIGS. 1 and 3) is formed at the upper end of the bracket 126. A shock absorber 132 is resiliently mounted at its upper end by rubber bushings 134 to the mounting flange 130 of the bracket 126, and pivotally mounted at its lower end by a pivot member 136 (FIG. 1) to the lower control arm 26 at a point intermediate the pivot member 78 and the spring seat 122.

As may be noted in FIG. 1, the upper control arms 86 and 110 straddle the circular mounting portion 20 of the sub-frame 12, and, as indicated in FIG. 1, the shock absorber 132 extends upwardly into the wheel well, represented at 138, without being connected thereto.

A fourth link or, so-called, trailing arm 140 (FIG. 1) is secured at its rear end to the mounting plate 72 by the bolts 142 threadably secured in the four threaded holes 74 thereof. The forward end of the trailing arm 140 extends to a position intermediate the spaced walls 144 (FIG. 2) adjacent the forward end 146 of the forwardly extending inverted U-shaped portion 18 of the sub-frame 12, to which it is connected by a through-bolt 148 and a pivot bushing 150 (FIG. 1). As shown in FIGS. 2A and 2B, the pivot bushing 150 is formed from suitable elastomeric material, and is confined between inner and outer metal sleeves 151 and 152. The inner sleeve 151 is mounted around the bolt 148, and the outer sleeve 152 secured, as by press-fitting, in an opening 152' formed in the end portion of the trailing arm 140.

Pivot bushing 150 serves to provide a low radial compliance rate which allows large fore and aft suspension excursions to improve ride characteristics. During large fore and aft suspension excursions, the two upper control arms 86 and 110 swing in unison to maintain a predetermined toe pattern.

The sub-frame 12 and the respective right and left components 16 are mounted on vehicle frame rails, represented at 153 and 154, respectively, at two locations on each side of the vehicle. Specifically, the cylindrical mounting portion 20 of the cradle 12 is secured through the first isolator 22 (FIG. 3) to the frame rail 153, and the forward end 146 of the forwardly extending inverted channel portion 18 of the sub-frame 12 is secured through a second isolator 156 (FIG. 1) to the frame rail 154.

A wheel 158 (FIG. 3) with a tire 160 mounted on the rim 162 thereof, is mounted via studs 164 on a mounting plate 166 which, in turn, is mounted on a member 168 secured by bolts 170 threadably mounted in threaded holes 172 (FIG. 9) formed in the center hub portion 48 of the knuckle 46.

Figures 7, 9:
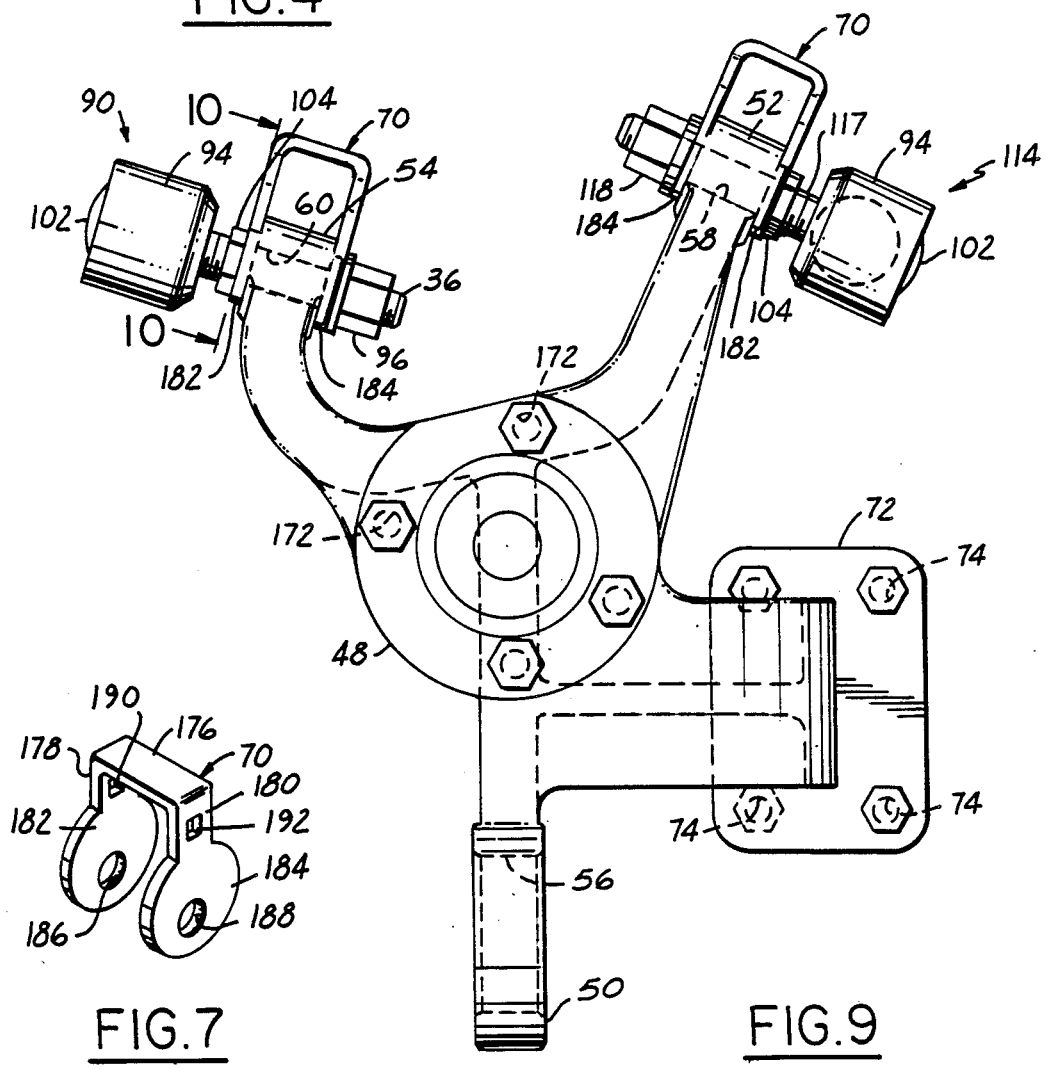
FIG. 7 is a perspective view of a portion of the invention.
FIG. 9 is a side elevational view of the FIG. 4 structure, and having the structure of FIGS. 7 and 8 mounted thereon.

The adjustment bracket 70 is shown in FIGS. 7 and 8. The bracket 70 is U-shaped and shown and used in an inverted orientation. The bracket is formed to include a central rectangular shaped segment 176, with rectangular segments 178 and 180 extending downwardly at right angles from the ends thereof. Round segments 182 and 184 are formed to extend from the respective segments 178 and 180. Round axially aligned openings 186 and 188 are formed through the respective round segments 182 and 184, offset a predetermined amount downwardly from the center thereof. Square, axially aligned openings 190 and 192 are formed through the approximate centers of the respective rectangular segments 178 and 180. As indicated above relative to FIGS. 4-6, the slots 66 are formed on opposite sides of each of the fore and aft mounting lugs 52 and 54 with the parallel shoulders 68 defining the width of each slot 66, the width being such that the respective round segments 182 and 184 of the adjustment bracket 70 fits snugly in place between the parallel shoulders 68 (FIGS. 10 and 11). The distance between the oppositely disposed slots 66 is substantially equal to the length of the central rectangular segment 176 of the bracket 70.

As shown in FIGS. 9-11, the round segments 182 and 184 are slid into place in the slots 66, between the parallel shoulders 68 (FIGS. 10 and 11) and straddling each fore and aft mounting lug 52 and 54 (FIG. 9). Each adjustment bracket 70 is confined in this position by virtue of the bolts 100 or 117 of one of the mounting portions 90 or 114 extending through the round openings 186 and 188 of the adjustment bracket 70 and the oval shaped openings 58 and 60 of the fore and aft mounting lugs 52 and 54, with the outer faces of the round segments 182 and 184 being confined between the stop collar 104 and a washer adjacent the nut 96 or 118.

Insofar as adjustment of the camber and toe patterns is concerned, as shown in FIGS. 9 and 10, the normal setting for the bracket 70 is in an upright position with respect to the oppositely disposed parallel shoulders 68 formed on either of the fore and aft mounting lugs 52 and 54, thereby positioning the mounting bolts 100 and 117 of mounting portions 90 and 114 of the respective long and short upper control arms 86 and 110 in the centers of the slotted openings 58 and 60 of the respective lugs 52 and 54. In this position, the predetermined camber and toe patterns resulting from the above described locations, lengths and orientations of the respective upper and lower control arms should be as shown in FIGS. 12 and 14, respectively, with the respective curb-zero degree points A and B as shown, along with the various jounce and rebound conditions related thereto as shown.

Figure 13:
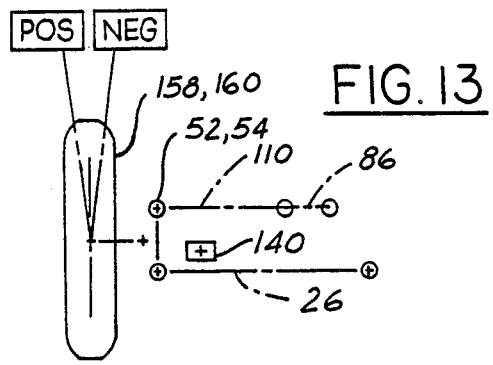
FIG. 13 is a schematic illustration defining the positive and negative camber angles represented in FIG. 12.
Figure 15:
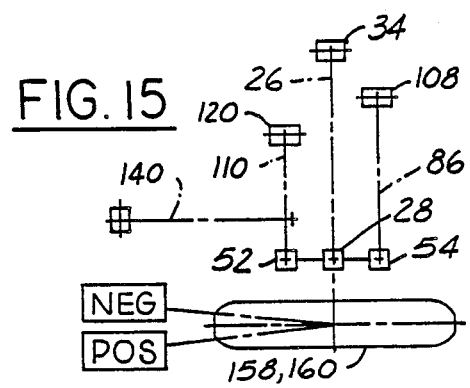
FIG. 15 is a schematic illustration defining the positive and negative toe angles represented in FIG. 14.

FIGS. 13 and 15 are schematic representations of the four links or arms, with the respective positive and negative ranges of camber and toe positions of the tire 160. More specifically, camber is illustrated in FIG. 13 as the angle that exists between a wheel's true axis of rotation and a vertical axis. As such, camber is positive when the top of the wheel is tilted away from the vehicle's center line, and negative when the opposite condition exists.

Toe is illustrated in FIG. 15 as the angle which the axis of rotation of the wheel makes with a horizontal axis extending perpendicular to the central longitudinal axis of the vehicle. The angle is negative when the front of the wheel is "toed-in", and positive when the front of the wheel is "toed-out."

Figure 12:
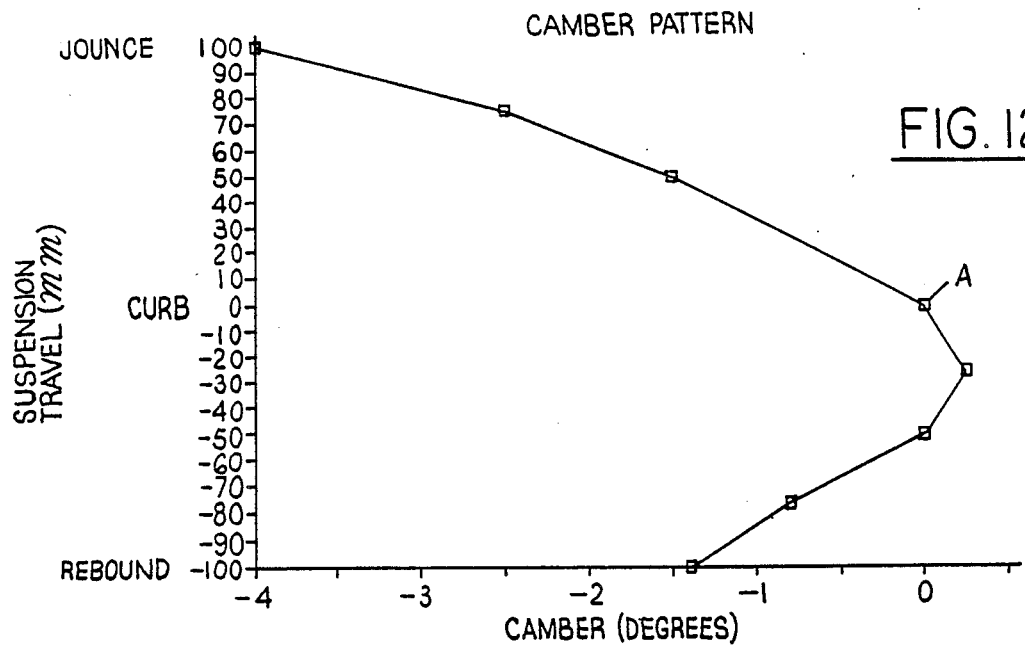
FIG. 12 is a curve illustrating the camber pattern embodied in the inventive sub-frame.
Figure 14:
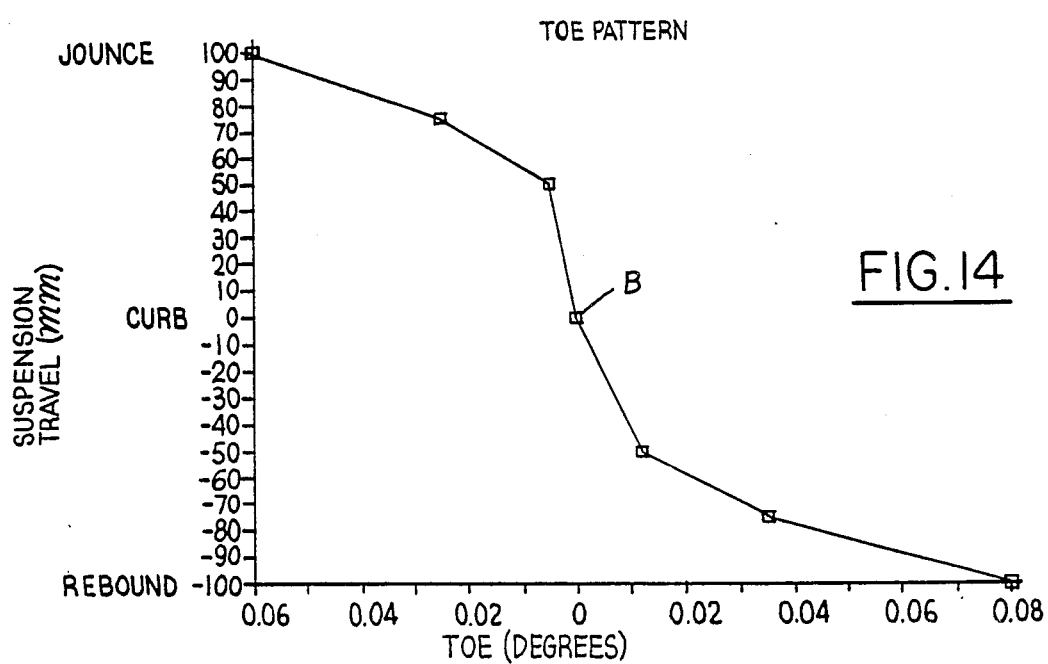
FIG. 14 is a curve illustrating the toe pattern embodied in the inventive sub-frame.

Due to manufacturing tolerances involved in the manufacture of the various upper and lower control arms 86, 110 and 26 and the respective associated fore and aft mounting lugs 52 and 54 of the knuckle 46, the points A and B of the camber and toe patterns may be displaced right or left with respect to the curb-zero degree positions represented in the FIGS. 12 and 14 at the time of assembly. Likewise, due to later wear of the component parts and/or impact of the tire, for example, against an obstruction, the points A and B may be moved with respect to the FIGS. 12 and 14 positions.

Should either of the above assembly or later changed conditions occur, adjustment of the camber and toe patterns back to the desired A and B locations is readily accomplished by inserting any suitable square cross-section tool (not shown) in the square openings 190 and 192 of the brackets 70, and rotating same either in a counterclockwise or a clockwise direction, as indicated in FIG. 11, as required to shift the patterns either right or left to attain the preferred orientations shown in the FIGS. 12 and 14.

More specifically, as may be noted from FIG. 15, adjustment of one of the upper mounting lugs 52 or 54 relative to its associated upper control arm 110 or 86 by the movement of only one bracket 70 would change the toe angle of the wheel 158 and its tire 160 from a positive or negative orientation to bring the B point of the curve back to the curb/toe zero setting shown in FIG. 14. As may be noted from FIG. 13, adjustment of both of the upper mounting lugs 52 and 54 relative to the upper arms 110 and 86 by the movement of both brackets 70 would change the camber angle of the wheel 158 and its tire 160 from a positive or negative orientation to bring the A point of the curve back to the curve/camber zero setting shown in FIG. 12.

It should be noted that the above described adjustment arrangement does not involve the rotation of the bolt 100 but, rather, only sliding same sidewardly and, therefore, the resilient material or rubber member 96 of the ball joints 90 and 114 is not stressed, and that actuation thereof divorces actuation from clamping.

It should also be noted that the above-described adjustment apparatus and method serve to insure that, where a mounting member and a link or arm are interconnected by virtue of a ball joint cantilevered at one end of the link or arm with a bolt extending therefrom through the mounting member, pivoting the adjustment bracket causes the bolt to move laterally across an elongated opening in the mounting member without any twisting or angling therein.

INDUSTRIAL APPLICABILITY

It should be apparent that the invention provides a novel, efficient, and cost effective arrangement for adjusting the camber and/or toe patterns of an independent suspension system, either while a sub-assembly prior to mounting on the vehicle, or after assembly in the event adjustment becomes necessary in the aftermarket.

While but one embodiment of the invention has been shown and described, other modifications thereof are possible within the scope of the following claims.

The embodiments of the invention in which an exclusive property or privilege is claimed are defined as follows:

What is claimed is:

1. For use with an independent suspension including a sub-frame, a knuckle having fore and aft upper mounting lugs, two upper control arms operatively connected at the ends thereof between the respective mounting lugs and said sub-frame, and a wheel mounted on the knuckle;

a wheel adjustment apparatus comprising parallel faces formed on opposite sides of each of said fore and aft mounting lugs, an elongated opening formed through each mounting lug, parallel shoulders formed at the outer edges of each of said parallel faces, and a bracket having two leg portions connected at one end thereof by a lateral portion; a round portion formed at the distal end of each leg portion, and aligned off-center openings formed through said round portions, and a bolt pivotally connected to the ends of said respective upper control arms and extended through said off-center openings and said elongated openings, wherein rotation of said brackets moves said bolt in said elongated opening to thereby move said mounting lugs relative to the associated upper control arm and change the settings of said wheel.

2. The wheel adjustment apparatus described in claim 1, wherein rotation of only one of said brackets changes the toe angle of said wheel, and rotation of both of said brackets changes the camber angle thereof.

3. The wheel adjustment apparatus described in claim 1, and aligned square openings formed through said two leg portions intermediate said round portions and said lateral portion, adapted to having a suitable tool inserted therethrough.

4. A method of adjusting the toe and/or camber of a wheel rotatably mounted on a knuckle having fore and aft upper mounting lugs, and a pair of upper control arms connected to said respective fore and aft upper mounting lugs, said method comprising the steps of:

a. forming an adjustment member having an off-center round opening formed therein;
 b. forming an elongated opening in each of said fore and aft upper mounting lugs;
 c. securing each of said upper control arms to said respective fore and aft upper mounting lugs by suitable bolt means extended through said off-center round opening of said adjustment member and said elongated opening of said fore and aft upper mounting lugs; and
 d. when needed, changing the angles of the axis and/or plane of said wheel by moving one or both said adjustment members so as to shift said respective bolt means in said elongated opening.

5. The method described in claim 4, and
 a. forming said adjustment member as a U-shaped bracket;
 b. forming slots in the oppositely disposed faces of each of said fore and aft mounting lugs;
 c. forming a round portion on each of the legs of said U-shaped bracket with said off-center round opening formed therein;
 d. fitting said round portions in said oppositely disposed slots, with said bolt extended through the off-center round opening thereof and through the elongated opening of said fore and aft mounting lugs.

6. For use with a mounting member and a ball joint cantilevered on one side thereof, adapted to having a bolt extending from the ball joint to the mounting member, and a link extending from said ball joint, an adjustment method comprising the following steps:
 a. forming oppositely disposed parallel slots on the sides of said mounting member;
 b. forming an elongated opening through said mounting member;
 c. forming a U-shaped bracket having parallel round ends thereon and axially aligned off-center round openings in the round ends;
 d. mounting the bracket with the round ends in said parallel slots;
 e. extending the bolt through the off-center round and the elongated openings; and
 f. adjusting the position of said link relative to said mounting member by pivoting said U-shaped bracket in said slots to thereby move said bolt laterally in said elongated opening so as to maintain the axis of the bolt in a parallel relationship with the axis of said elongated opening.

7. For use with a mounting member and a ball joint cantilevered on one side thereof, adapted to having a bolt extending from the ball joint to the mounting member, and a link extending from said ball joint, an adjustment apparatus comprising:

oppositely disposed parallel slots formed on the sides of said mounting member;

an elongated opening through said mounting member substantially in the center of said parallel slots;

a U-shaped bracket having parallel round ends formed thereon and axially aligned off-center round openings formed in the round ends, and mounted on said mounting member with the round ends in said parallel slots;

said bolt extended through the off-center round and the elongated openings and adapted to adjust the position of said link relative to said mounting member by pivoting said U-shaped bracket in said slots to thereby move said bolt laterally in said elongated opening so as to maintain the axis of the bolt in a parallel relationship with the axis of said elongated opening; and a nut for securing said bolt.

* * * * *